United States Patent [19]

Wood

[11] Patent Number: 4,637,754

[45] Date of Patent: Jan. 20, 1987

[54] LINING OF PIPELINES AND PASSAGEWAYS

[75] Inventor: Eric Wood, Northants, United Kingdom

[73] Assignee: Insituform Holdings Limited, Douglas, Isle of Man

[21] Appl. No.: 681,964

[22] Filed: Dec. 14, 1984

[30] Foreign Application Priority Data

Jan. 7, 1984 [GB] United Kingdom ............... 8400364

[51] Int. Cl.[4] ...................... E21D 11/38; B29C 63/36
[52] U.S. Cl. .................................. 405/150; 156/287; 405/154
[58] Field of Search ............... 405/53, 150, 154, 259; 138/97, 141; 156/287

[56] References Cited

U.S. PATENT DOCUMENTS

| 4,064,211 | 12/1977 | Wood | 405/150 X |
| 4,239,416 | 12/1980 | Borca et al. | 405/53 |
| 4,350,548 | 9/1982 | Zenbayashi et al. | 405/150 X |
| 4,466,758 | 8/1984 | Hinterreiter et al. | 405/150 |

Primary Examiner—David H. Corbin
Attorney, Agent, or Firm—David A. Jackson

[57] ABSTRACT

The invention provides that a resin impregnated lining tube is applied to a pipeline or passageway surface to which have been pre-applied pads impregnated with the same resin, so that the resin impregnated pads bond to the liner as curing of the resin takes place.

7 Claims, 3 Drawing Figures

LINING OF PIPELINES AND PASSAGEWAYS

This invention relates to the lining of pipelines and passageways by the now well established and successful method of shaping a lining tube, which is flexible in nature when installed, to the pipeline or passageway surface, and then curing synthetic resin embodied in the lining to a hard state, whereby the lining becomes free standing and is shaped to the pipeline or passageway surface.

In the most widely practiced form of this invention for example as described in British Pat. No. 1449455, the flexible lining tube comprises layer of fibrous material, such as a needled felt which is impregnated with the curable resin, the felt or fibrous material forming an ideal absorbing material ensuring the effective take-up of the resin to provide a finished liner of the required thickness. Bonded to one side of this fibrous material is an impermeable film. When the lining is first manufactured, the film is to the outside of the felt material, which enables impregnation by charging a quantity of resin into the inside of the flexible tube and then by squeezing the tube for example by passing it through nip rollers, in order to ensure even distribution of the resin in the felt material.

When the flexible lining tube is inserted in the pipeline or passageway, one end of it is anchored, and then the remainder of the tube is everted through the anchored end so that the tube everts into the pipeline or passageway, and onto the surface to be lined. the everting medium is usually a liquid, and when the eversion process is completed, the liquid stays inside the everted tube to keep it to the pipeline or passageway surface shape whilst the resin cures. To this end, heat may be circulated through the everted tube in order to effect or accelerate the cure initiation process. After curing has commenced with the type of resin normally used, the cure usually continues naturally until curing is completed.

In another embodiment of carrying out the lining process, the lining tube is not everted, but is fed into the pipeline or passageway and then is inflated using fluid pressure to shape the lining tube to the passageway surface. In this arrangement, the lining tube must be constructed differently, and has to be provided with an internal plastic impermeable membrane in the form of a tube, for effecting the inflation process. Optionally, the lining may be provided with an outer membrane to prevent contact with the resin.

In each case, the lining tube is of course flexible and manipulable, even when impregnated with resin, prior to the insertion step. In each case however the lining tube is tailored to the size of the pipeline or passageway to be lined, so that the tube will not suffer excessive tension or stretching when it is held to the pipeline or passageway surface.

When the tubular liner is placed in position and the resin is cured, the liner forms a hard shell typically of 3 to 12 millimeter thickness of resin in which is embedded fibrous material such as the felt layer of the laminate. Whilst these rigid shell linings have shown to be extremely effective in a wide range of applications, in some applications, for example where the lining is required for a large diameter pipeline or passageway, of the order of 6 feet, the pipeline or passageway is located in a water table of modest head, for the lining to withstand the external pressure created by the water head, theoretically by design the lining needs to be of the order of 30 millimeters, or 1.5 inches. This is too thick to make the process practical.

The present invention is concerned with a method and a means for imparting compressive hoop stress to the lining material when cured, without the necessity of having to increase the thickness of the lining material other than marginally.

In accordance with the invention, in the lining process, there are applied to the pipeline or passageway surface anchor means which serve to anchor pads of resin absorbent material to the passageway or pipeline surface prior to the lining of same with the resin absorbent liner, and wherein the said pads are impregnated with resin and the liner is applied to the pipeline or passageway surface so that the resin absorbent layer is applied to said pads whereby the resin of the pads and the resin of the liner will become one, and when the resin has cured, the pads will anchor to the liner.

As will be understood, the said pads provide anchorage points to the surrounding structure for the liner, whereby the liner will be capable of withstanding much greater loop stresses than it would without such anchorage points.

The said pads may be circular, and may be anchored to the pipeline or passageway surface by means of rawl plugs or pins or the like.

Whilst the invention has main application to lining operations involving the lining of large diameter pipelines or passageways, the principal of the invention can be applied to pipelines or passageways of any suitable diameter.

By using these anchorage pads and pins, linings having much greater hoop stress in compression than when the pads are not provided can be achieved. For example an increase in hoop stress of the order of 30 times can be achieved by the utilisation of the pads without any or any appreciable increase in the thickness of the lining tube.

The lining tube can be applied by an eversion process, or can be inserted in the pipeline or passageway and then inflated by gas and/or liquid pressure.

In a specific example, circular pads of resin absorbent material are pinned to the wall of the pipeline passageway or structure at 12 inch intervals along the length of the pipeline or passageway, which may be of the order of 3 to 6 feet in diameter. The pads are 4 inches in diameter and are pinned using studs known as "Hilti" (trade mark) which may be of the order of 1.25 inches long and are fired into the pipeline or passageway surface using a suitable firing gun. 2 inch diameter stainless steel washers trap the pads via the pin.

When the operation of applying a tubular lining takes place, the pads are preimpregnated with resin, and the tube is applied before the resin cures so that the resin of the lining cures with that of the pad, and the holding washer ends up encapsulated in resin, which eventually cures to a hard state whereby extra anchorage for the lining is achieved, and the hoop stress which the lining can withstand is very much increased.

The method of using pins for anchoring the pads is especially suitable for linings of sound brick or concrete, and it is also to be mentioned that alternative anchoring arrangements can be employed.

The basic concept of the invention will now be described by way of example, with reference to the accompanying diagrammatic drawing, wherein.

Figure 1:
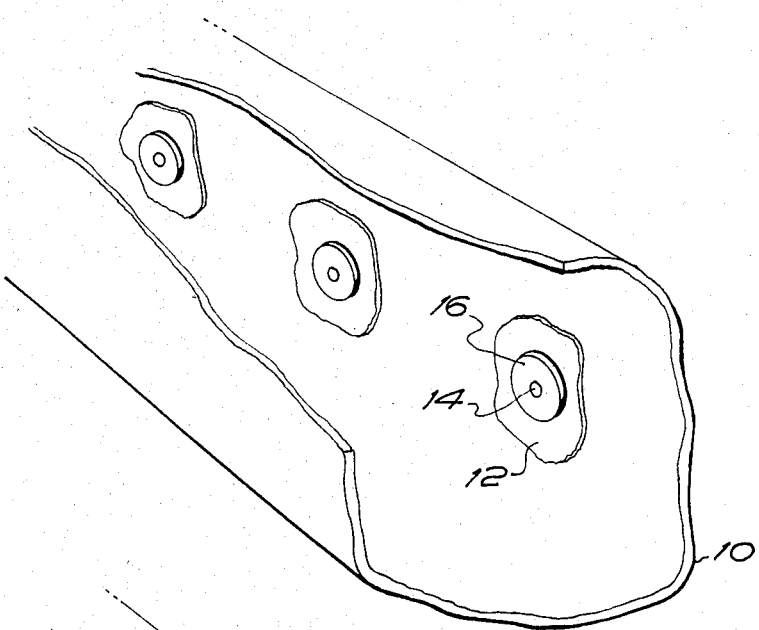
FIG. 1 illustrates a portion of a passageway to be lined in perspective elevation, with several impregnated pads applied thereto.

Referring to FIG. 1, a pipeline or passageway is indicated by numeral 10, and applied to the wall thereof are a plurality of pads 12 applied by pins 14 carrying washers 16. The pads 12 are of resin absorbent material such as felt and are impregnated with curable resin. The pads may be applied to the inner surface of the pipe 10 in any desired pattern.

Figure 2:
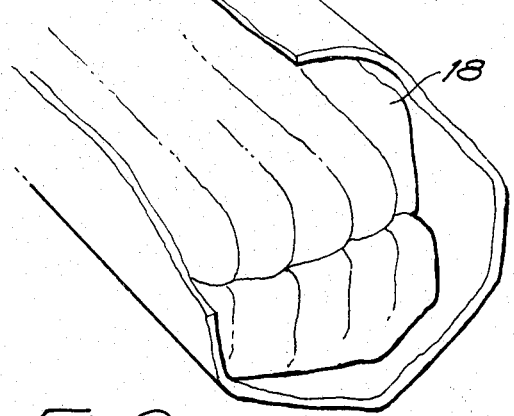
FIG. 2 illustrates how the impregnating liner is applied to the passageway.
Figure 3:
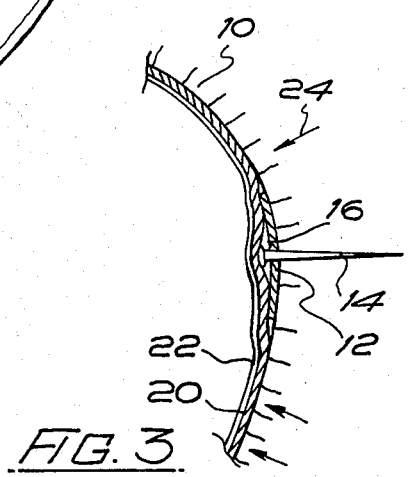
FIG. 3 is a sectional elevation showing how the pads are formed.

FIG. 2 shows how flexible lining tube 18 is applied to the interior of the pipe 10 over the pads 12 before the resin impregnating such pads has cured. The surface of the lining 18 which is applied to the surface 10 is also impregnated with resin, and the resin surface of the liner therefore contacts the resin impregnated pads 12 and then the resin both in the liner 18 and in the pads 12 are cured so that a hard lining shell lining the passageway surface is formed, as shown in FIG. 3. In FIG. 3, the lining is shown to comprise a resin layer 20 and an inner membrane 22. As the lining 18 is everted into a passageway 10 prior to its application the membrane 22 is to the outside. When curing takes place both with the resin in the layer 20 and in the pad 12, a coherent resin mask is formed, and the washers 16 become trapped in this mask. The anchorage of the washer by means of the pin 14 improves the resistance of the rooted liner to collapse when subjected to radial compressive forces as indicated by arrows 24 in FIG. 3.

The anchorage means may take any form, and the distribution pads throughout the passageway surface may be at any desired pitching.

I claim:

1. A method of lining a pipeline or passageway comprising the steps of:
    A. inserting pads of resin absorbent material impregnated with a curable synthetic resin into the pipeline or passageway at spaced intervals by driving an anchoring pin through each pad into a wall of the pipeline or passageway so that a head of said pin traps the respective pad to said wall while leaving an overlapping portion of the pad surrounding the head of the pin;
    B. inserting into the pipeline or passageway, before the resin impregnating said pads of material has cured, a resin impregnated tubular liner presenting a face of uncured resin to said pads so that the uncured resin face of the liner comes into resin contact with the overlapping portions of the pads of resin absorbent material; and
    C. curing the resin of the pads of resin absorbent material and the liner such that the pin heads become embedded in cured resin and provide compressive hoop stress reinforcement for the liner.

2. A method according to claim 1, wherein Step B includes the step of inserting said tubular liner by an eversion process.

3. A method according to claim 1, further including the step of inserting a washer between each pad and the respective pin head such that said pin extends through said washer, so as to strengthen the resistance of said liner to radial compressive forces thereon.

4. A method according to claim 1, wherein said pads are circular.

5. A method according to claim 1, wherein the pads are pinned using studs which are fired into the pipeline or passageway surface using a suitable firing gun, the pins carrying washers to trap the pads to the pipeline or passageway surface.

6. A method according to claim 3, wherein the pads are pre-impregnated with resin, and the tube is applied before the resin cures so that the resin of the lining cures with that of the pad and the holding washer ends up as encapsulated in resin which eventually cures to a hard state whereby extra anchorage for the lining is achieved, and the hoop stress which the lining can withstand is increased.

7. A method according to claim 5, wherein the pads are pre-impregnated with resin, and the tube is applied before the resin cures so that the resin of the lining cures with that of the pad and the holding washer ends up as encapsulated in resin which eventually cures to a hard state whereby extra anchorage for the lining is achieved, and the hoop stress which the lining can withstand is increased.

* * * * *